March 9, 1971  F. S. SHEKER  3,568,347
VEHICLE TOP SIGN
Filed Feb. 27, 1969  2 Sheets-Sheet 1
FIG. 1
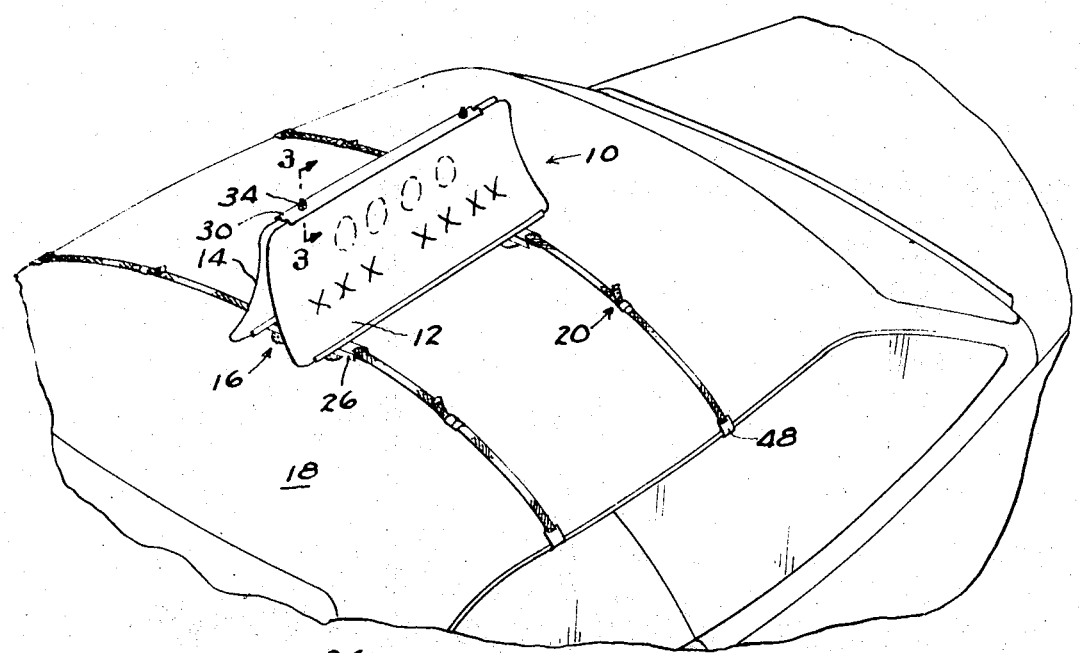
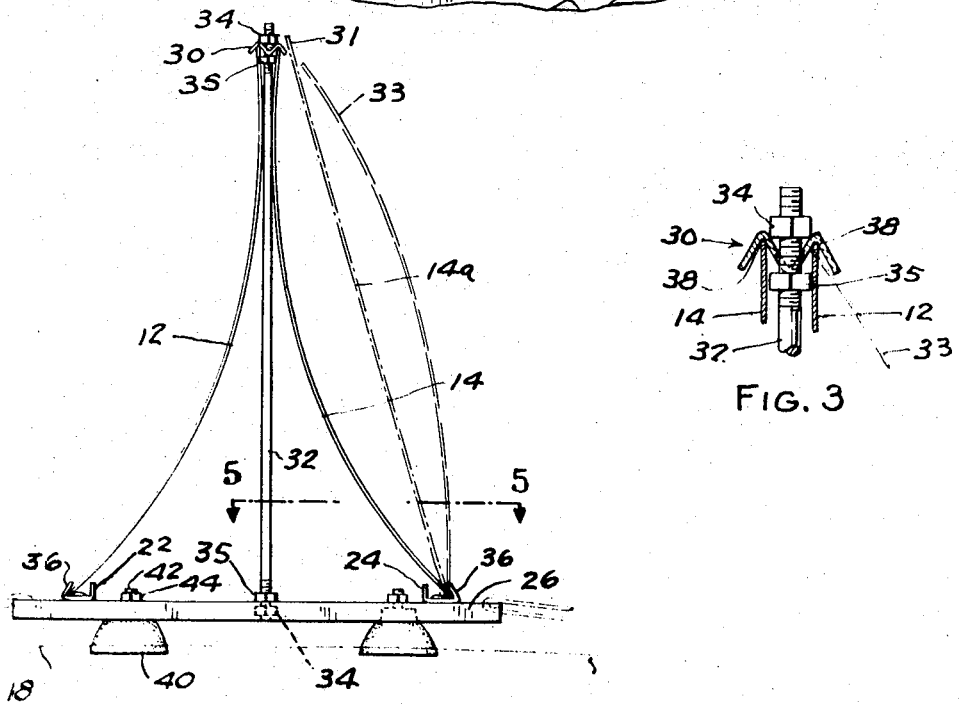
FIG. 2
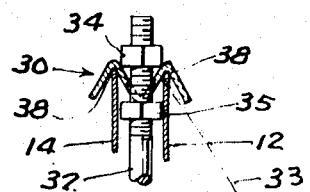
FIG. 3
INVENTOR.
FODES F. SHEKER
BY
Barnes, Kisselle, Raisch & Choate
ATTORNEYS March 9, 1971 F. S. SHEKER 3,568,347
VEHICLE TOP SIGN Filed Feb. 27, 1969

INVENTOR.
FODES F. SHEKER
BY
Barnes, Kisselle, Raisch & Choate
ATTORNEYS 3,568,347
VEHICLE TOP SIGN
Fodes F. Sheker, 3000 E. Jefferson Ave.,
Detroit, Mich. 48207
Filed Feb. 27, 1969, Ser. No. 802,902
Int. Cl. G09f 1/10
U.S. Cl. 40—125                                                5 Claims

ABSTRACT OF THE DISCLOSURE

A two-panel display device for mounting on a vehicle roof with a holding frame of two generally parallel channels with upturned edges and a third M-shaped channel positioned above, laterally between and parallel to the other channels. Cross braces are connected to the two channels and tie rods connect the cross braces to the third channel. Two normally flat, resilient and flexible display panels are each bowed inwardly toward each other and inserted between the third channel and one of the other channels so that they are urged, due to their inherent resiliency, into firm engagement with and held in position by the channels.

---

This invention relates to display devices and more particularly to a device with two display panels suitable for mounting on the top of a vehicle.

Objects of this invention are to provide a display structure (1) which is rigid even though its components are lightweight, flexible and loosely assembled, (2) with two display panels which are independently readily removable to facilitate maintenance of the structure and changing the message being displayed, and (3) which can be economically constructed and assembled from a few standardized readily available channel sections.

These and other objects, advantages and features of this invention are disclosed in the following detailed description and drawings in which:

FIG. 1 is a fragmentary isometric view illustrating the display structure of this invention mounted on the roof of an automobile.

FIG. 2 is an end elevational view of the display device with positions of a resilient display panel being inserted in the holder illustrated in phantom lines.

FIG. 3 is a fragmentary sectional view on line 3—3 of FIG. 1 illustrating the engagement of the display panels with a top retainer strip.

Referring in detail to the drawings:

FIG. 1 illustrates a display device of this invention designated generally as 10 with display panels 12 and 14 and a holding frame designated generally as 16. Holding frame 16 is mounted on a roof 18 of an automobile and secured to the roof by belt and buckle assemblies designated generally as 20.

Figure 4:
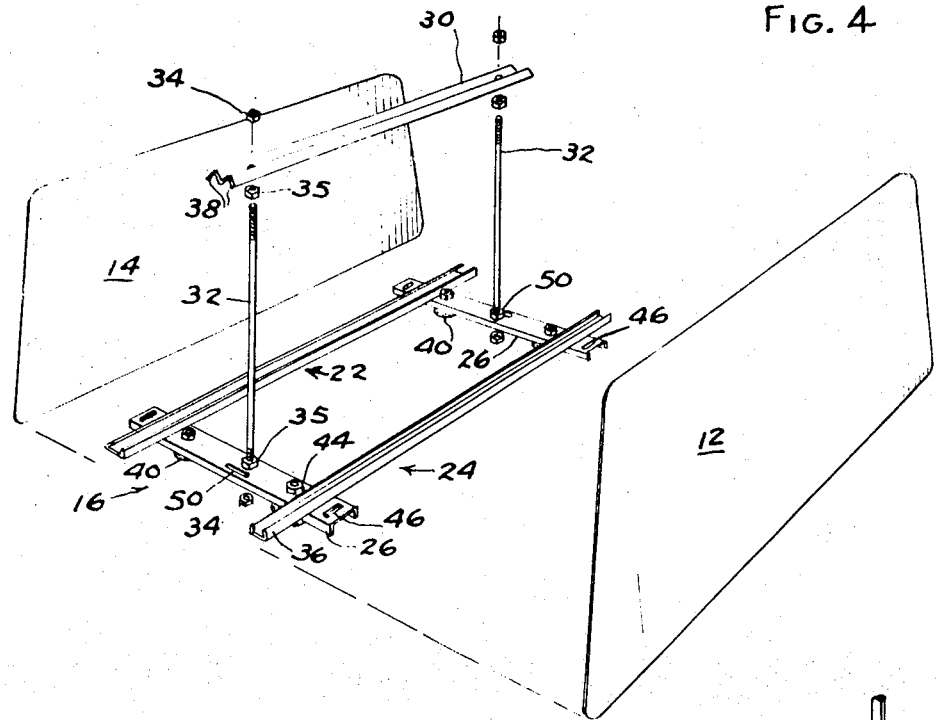
FIG. 4 is an exploded isometric view of the display device of this invention.
Figure 5:
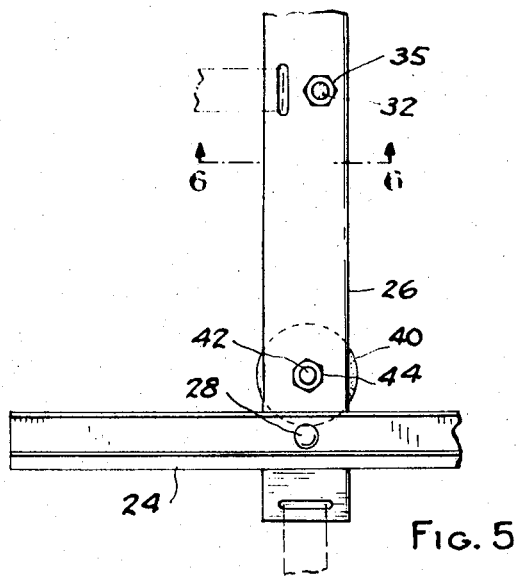
FIG. 5 is a fragmentary sectional view on line 5—5 of FIG. 2 illustrating some of the details of the base of the holding frame.

As shown in FIG. 4, holding frame 16 is formed of a plurality of channel members preferably of a lightweight material such as aluminum or magnesium. A pair of angle strips forming retainers 22 and 24 are interconnected in spaced apart generally parallel relationship to each other by two generally U-shaped cross braces 26 to form the base of holding frame 16. As shown in FIG. 5, angle strips 22, 24 and cross braces 26 are interconnected by suitable fasteners such as rivets 28. A top strip forming a retainer 30 is positioned generally parallel to and spaced above and laterally between angle strips 22 and 24. Retainer 30 is connected to the base by upright tie rods 32 and nuts 34 so that the distance which retainer 30 can be moved vertically upward and away from the base is limited by nuts 34 at the upper and lower ends of the tie rods. Optionally, nuts 35 can also be threaded on the upper and lower ends of the tie rods so that retainer 30 is rigidly attached to the base by the tie rods.

As shown in FIG. 2, display panels 12 and 14 are captivated in holding frame 16 by the cooperation of retainer angle strips 22, 24, retainer top strip 30 and tie rods 32. Outboard upturned edges 36 of angle strips 22 and 24 are inclined slightly inwardly toward each other and (as shown in FIG. 2) top strip 30 is M-shaped to provide two grooves 38 to retain the longitudinal upper edges of panels 12 and 14. The entire display structure is made rigid and panels 12 and 14 are firmly retained between angle strips 22 and 24 and top strip 30 by bowing or slightly compressing panels 12 and 14 so that tie rods 32 are placed under tension. Panels 12 and 14 are formed of a normally flat sheet of resilient flexible panel material such as metal, plastic, etc. As shown in FIG. 2, the length of tie rods 32 are adjusted so that before being bowed the panels in a free state (designated by phantom lines 14a) extend beyond or above top strip 30 as indicated at 31. Panels 12 and 14 are each inserted in the frame by bowing them outward away from each other as indicated at 33 and then engaging the upper edge of each panel in a groove 38 in top strip 30 as indicated in FIG. 3. The center portion of the panels are then urged toward each other so that the panels snap into position bowed toward each other and bearing against rods 32 as shown in solid lines at 12 and 14 in FIG. 2. This places panels 12 and 14 under a compressive load and tie rods 32 in tension, thereby providing a sturdy and rigid display structure even though the individual components are of rather lightweight construction and relatively loosely assembled. With this arrangement the component parts of the holding frame can be loosely assembled and the whole display structure will still be rigid due to the compressing of the display panels and placing the tie rods under tension. Also, since panels 12 and 14 bear against rods 32, they cannot be readily displaced from retainers 22, 24 and 30 by further inward and downward bowing of the panels. The rigidity of the display structure is also enhanced by positioning retainers 22, 24 and 30 so that the lower edges of panels 12 and 14 are widely spaced with respect to the upper edges of the panels. When panels 12 and 14 are so positioned, they form in conjunction with the holding frame a generally triangular configuration which provides a comparatively strong and rigid display structure.

Figure 6:
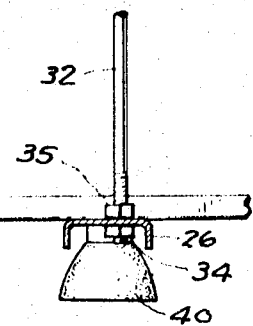
FIG. 6 is a fragmentary sectional view on line 6—6 of FIG. 5 illustrating the arrangement of the suction cups and tie rods of the holder.

This display device is attached and secured to a vehicle roof by suction cups and belt assemblies with hooks connecting to the rain gutters of a vehicle. As shown in FIGS. 4, 5 and 6, two suction cups 40 with threaded studs 42 are secured in spaced apart relationship to each cross brace 26 of holding frame 16 by nuts 44. An elongated slot 46 is provided adjacent each end of each cross brace 26 for the attachment of one end of belt assembly 20 to holding frame 16 and in a similar manner the other end of belt assembly 20 is attached to a rain gutter hook 48. As shown in FIG. 1, the display device can be positioned on a vehicle roof so that the display panels are substantially parallel to the direction of travel of the vehicle. Alternatively, the display device can be positioned on the roof of a vehicle so that the display panels are generally transverse to the direction of travel of the vehicle. To facilitate mounting of the display device in the transverse position, an elongated slot 50 is provided in the center portion of each cross brace 26 so that belt assemblies 20 can be removed from slots 46 and two of the belt assemblies connected to holding frame 16 through slots 50. When the display device is used in the transverse position, it can be attached to the roof of a vehicle with only two belt assemblies 20.

This display device can be economically constructed from a few extruded channel-shaped members and provides a sturdy and rigid construction even through the individual components are lightweight, flexible and may be loosely assembled. Since each display panel independently snaps into the holding frame, the message being carried by this display device can be readily changed and the display structure can be serviced without removing the holding frame from the vehicle to which it is attached.

What is claimed is:

1. A display device comprising, a base, said base having first and second longitudinally extending and laterally spaced retainers and at least two cross braces each fixed adjacent opposed ends to said first and second retainers, a third longitudinally extending retainer spaced above and laterally between said first and second retainers, a pair of spaced supports, one adjacent each end of the base and extending upwardly from said base along the longitudinal central line between said first and second supports, said supports being connected with said base at their lower ends and with said third retainer along the longitudinal central portion thereof at their upper ends, said supports comprising tension members and said connections limiting movement of said third retainer upward away from said base, and two normally generally flat display panels of a resilient sheet material extending longitudinally beyond said spaced supports and each having an upper edge firmly engaged with said third retainer on opposite sides of the connection between the third retainer and said supports and a lower edge firmly engaged with one of the other of said retainers by being bowed inwardly toward each other from top to bottom and placing said supports in tension to longitudinally and laterally stabilize said retainers.

2. The display device as defined in claim 1 wherein said supports loosely connect said third retainer and base.

3. The display device as defined in claim 1 in which the lower edges of said panels are widely spaced from one another relative to the upper edges thereof such that said panels incline upwardly toward each other.

4. The display device as defined in claim 3 in which said first and second retainers are channels each having at least one upturned edge, said last-mentioned edges extending generally parallel to and inclined toward each other.

5. The display device as defined in claim 4 in which said supports comprise two tie rods loosely connecting said third retainer with said cross braces.

References Cited

UNITED STATES PATENTS

| 2,076,530 | 4/1937 | Eastman | 40—129C |
| 3,021,186 | 2/1962 | Immermann | 40—16.2 |
| 3,208,173 | 9/1965 | Shank | 40—129C |

FOREIGN PATENTS

| 1,161,470 | 1/1964 | Germany | 40—10 |

ROBERT W. MICHELL, Primary Examiner